Figure 1:
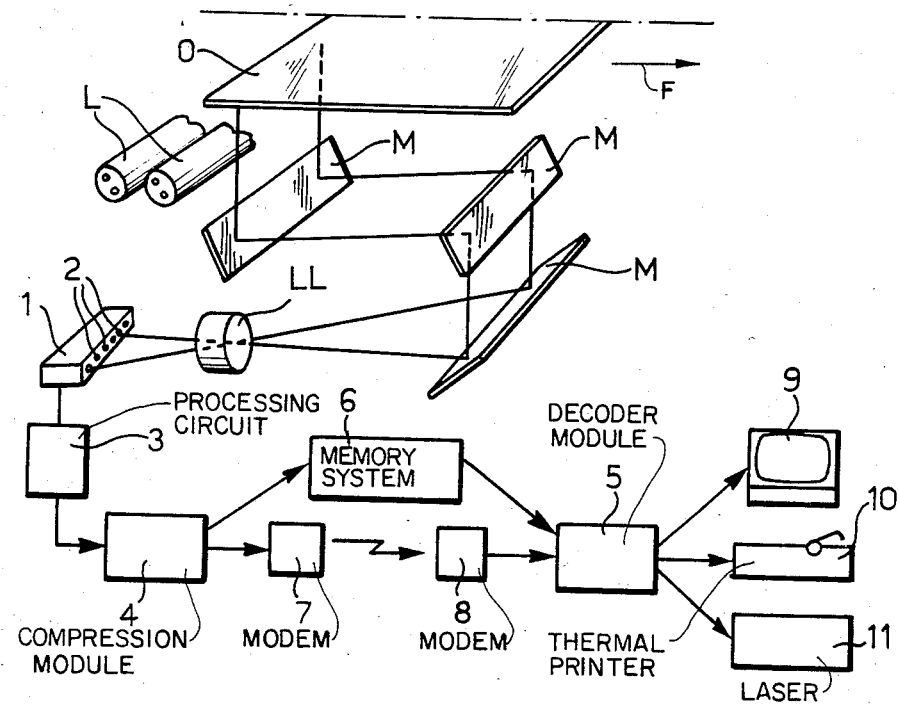

United States Patent [19]

Ciardiello et al.

[11] Patent Number: 4,554,594
[45] Date of Patent: Nov. 19, 1985

[54] APPARATUS FOR SCANNING AND DIGITALLY PROCESSING HALF-TONE IMAGES

[75] Inventors: Giovanni Ciardiello, Ivrea; Ferdinando Augusti, Turin, both of Italy

[73] Assignee: Ing. C. Olivetti & C., S.p.A., Ivrea, Italy

[21] Appl. No.: 476,559

[22] Filed: Mar. 18, 1983

[30] Foreign Application Priority Data

Mar. 22, 1982 [IT] Italy .................. 67360 A/82

[51] Int. Cl.[4] .............................................. H04N 1/40
[52] U.S. Cl. .................................. 358/283; 358/282; 358/280
[58] Field of Search ............... 358/283, 280, 298, 299, 358/282

[56] References Cited

U.S. PATENT DOCUMENTS

| 3,662,341 | 5/1972 | Baumgartner et al. ........ 382/9 |
| 3,739,084 | 6/1973 | Heinrich ..................... 358/283 |
| 4,084,196 | 4/1978 | Tisae et al. .................. 358/283 |
| 4,214,277 | 7/1980 | Urich ......................... 358/283 |
| 4,237,495 | 12/1980 | Yamamoto .................. 358/283 |
| 4,240,107 | 12/1980 | Yoshida ................... 358/280 X |
| 4,251,837 | 2/1981 | Janeway, III ............... 358/283 |
| 4,366,507 | 12/1982 | Mori .......................... 358/283 |

FOREIGN PATENT DOCUMENTS 56-143765 11/1981 Japan .

OTHER PUBLICATIONS

"High Speed A/D Conversion", Recent Developments and Applications; O. J. Downing et al.
"Wireless World", vol. 83, #1504, Dec. 1977, pp. 65-70.

Primary Examiner—Howard W. Britton
Assistant Examiner—Victor R. Kostak
Attorney, Agent, or Firm—Banner, Birch, McKie & Beckett

[57] ABSTRACT

The apparatus comprises an optical scanning device for scanning elements or portions of an image or for providing corresponding electrical image signals which are fed to a plurality of threshold comparator circuits where they are compared with respective reference signals which define a scale of half tones. The apparatus further includes a digital-signal generator circuit arranged to generate a plurality of digital signal combinations each of which is indicative of a respective predetermined matrix pattern of white or black points associated with a respective half tone of the scale. This generator circuit, in operation, outputs the combination of digital signals relating to the pattern associated with the half tone currently indicated by the signals provided by the threshold comparator circuits. The apparatus effects the electronic processing of half-tone images and may further include means for processing white/black image portions, and detection and switching means arranged to identify the transitions from half-tone image portions to white/black image portions and vice versa.

11 Claims, 5 Drawing Figures

APPARATUS FOR SCANNING AND DIGITALLY PROCESSING HALF-TONE IMAGES

The present invention relates to an apparatus for scanning and digitally processing images with half tones, that is images (photographs or illustrations with grays or colours) which have tones intermediate between black and white.

In particular the invention relates to an apparatus of the type comprising:

an optical scanning device for scanning elements or portions of an image and for providing corresponding electrical image signals, and a plurality of threshold comparator circuits for comparing the image signals with respective reference signals which define a scale of half tones.

Known apparatus of the type specified above provide digital signals which allow the reconstruction of an image with half tones making use of techniques and algorithms of considerable complexity carried out with circuitries which are consequently complicated and expensive.

The object of the invention is to provide an apparatus for scanning and digitally processing images with half tones which allows the reconstruction of an image more faithfully than is possible with conventional apparatus in a manner which is simpler, more versatile and more economic.

In order to achieve this object the present invention provides an apparatus of the type specified above, the main characteristic of which lies in the fact that it further includes a digital-signal generator circuit arranged to generate a plurality of combinations of digital signals each combination being indicative of a respective predetermined matrix pattern of white or black points associated with a respective half tone of the scale; the digital-signal generator circuit, in operation, outputting the combination of digital signals which corresponds to the half tone currently indicated by the signals output by the threshold comparator circuits.

According to a further characteristic of the invention, the apparatus may further include a sampling and control circuit connected between the threshold comparator circuits and the digital-signal generator circuit and arranged to sample the outputs of the threshold comparator circuits at a predetermined frequency and, at each sampling, to cause the output by the generator circuit of the combination of digital signals corresponding to the half tone currently indicated by the signals provided at the output of the threshold comparator circuits.

The scanning device may include, for example, a linear array of photo-detectors for examining the image elements of successive lines of an image and for outputting an analogue signal substantially representing the succession of the signals output by the individual photo-detectors.

The sampling and control circuit according to a further characteristic of the invention includes regulating means for modifying the frequency of sampling of the outputs of the threshold comparator circuits.

By virtue of this characteristic, according to which the outputs of the threshold comparator circuits may be sampled at a frequency which can be modified and in particular at a different frequency which is greater than that of interrogation of the photo-detectors of the scanning device, it is possible to achieve the reconstruction (printing) of the image scanned with a different definition and particularly a greater definition than that of scanning of the examined image.

It is thus easy to make reductions or enlargements of the original image.

The invention also relates to an apparatus for scanning and digitally processing composite images, that is, comprising half-tone image portions and white/black image portions.

Figure 2:
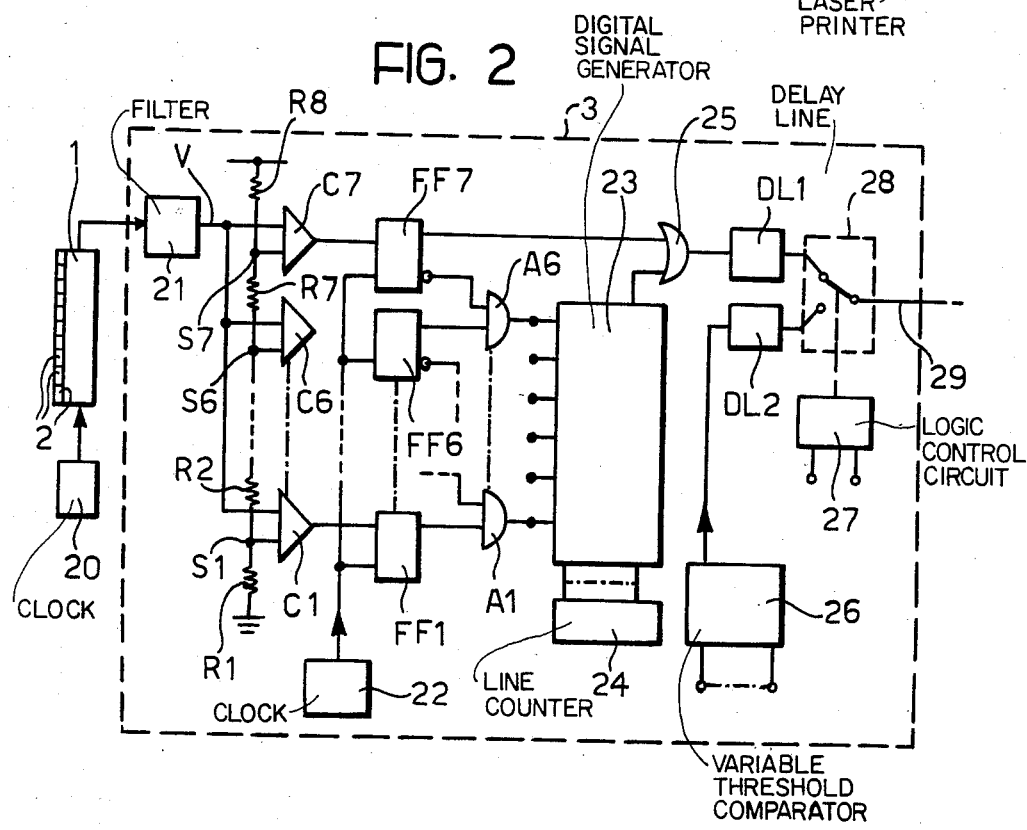
Figure 3:
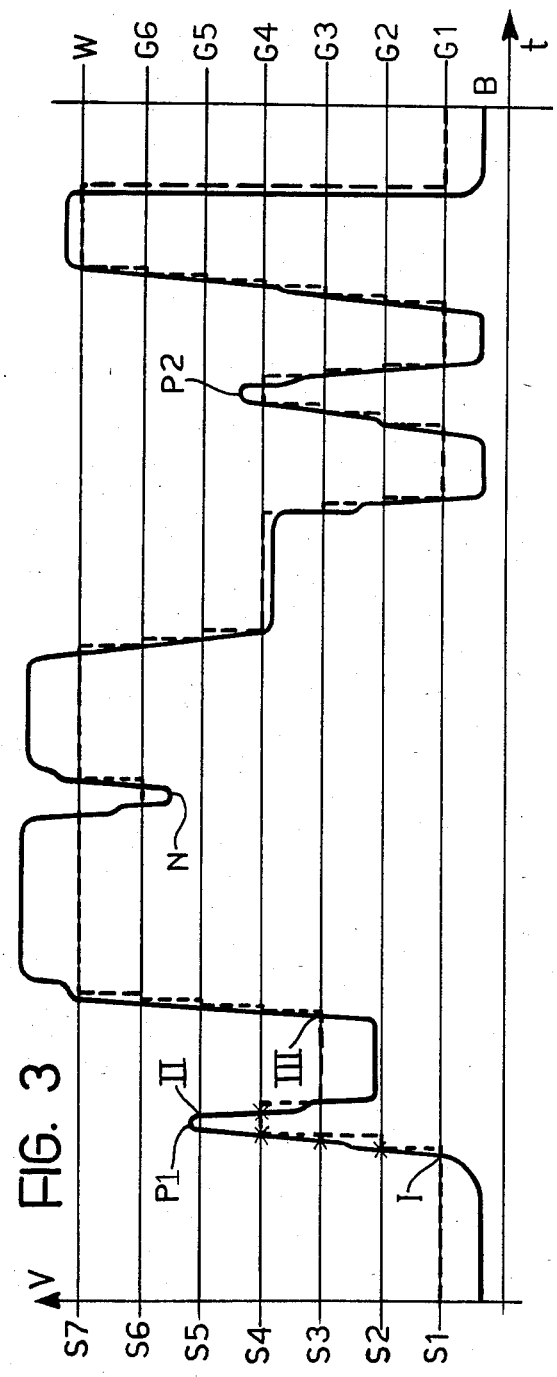
Figure 4:
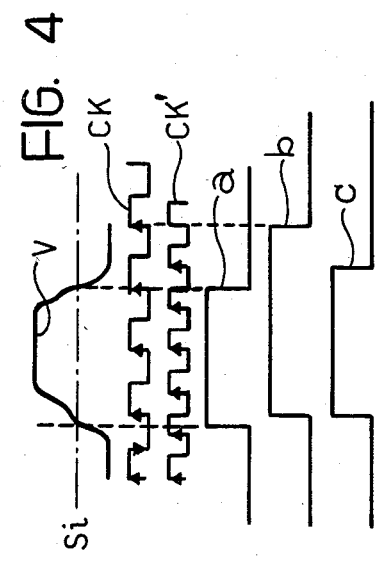
Figure 5:
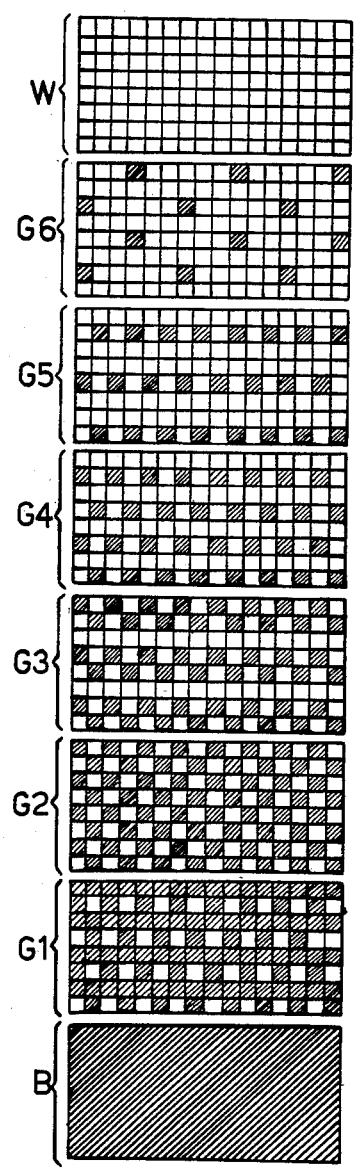

Further characteristics and advantages of the invention will appear from the detailed description which follows, given with reference to the appended drawings, provided purely by way of non-limiting example, in which:

FIG. 1 illustrated schematically a system for reproducing images comprising an apparatus according to the invention, FIG. 2 is a circuit diagram, partly in block form, of an apparatus according to the invention, FIGS. 3 and 4 are diagrams, given by way of example, of waveforms of signals generated in the apparatus illustrated in FIG. 2, and FIG. 5 illustrates a plurality of matrix patterns of white or black points, forming a scale of half tones, usable in the apparatus according to the invention for the reproduction of images with half tones.

FIG. 1 illustrates a system for the reproduction of an image with half tones. In this system successive lines of an original 0, illuminated by lamps L, are focused on a scanning device 1 including a linear array of photo-detectors, by means of mirrors M and an objective LL. the scanning of the entire original page 0 is carried out by the movement of the lamps L and the mirrors M at a predetermined velocity in the direction of the arrow F.

The signals output by the scanning device 1 reach a processing circuit 3 described in greater detail below with reference to FIG. 2, which outputs image signals, for example, to a compression module 4. Compression having occurred, the image signals are transmitted to a decoder module 5, for example, via a memory system 6 or via a transmission line or channel by means of two modems 7, 8. The decoder module 5 then outputs control signals to image-reproducing apparatus which may be constituted, for example, by a video terminal 9 or by a thermal printer 10, or even by a laser printer 11.

The "reading" of each line of the original 0 is carried out, as indicated previously, by means of the array 1, for example, of charge-coupled cells (CCDS) 2, each of which examines an image element (pixel) with a predetermined definition. The cells of the array 1 are interrogated at a predetermined frequency established by a timing pulse generator circuit (clock) 20. The outputs of the individual cells 2 are serialised and fed to the input of a filter 21 which outputs an analogue signal.

In the graph of FIG. 3, the curve shown in continuous outline illustrates, by way of example, variation of the analogue signal V output by the filter 21 as a function of the time T during the course of scanning an entire elementary line of the original 0.

The signal V is fed to the inputs of a plurality of threshold comparator circuits C. In the example of FIG. 2, seven threshold comparators are shown indicated respectively by $C_1$ to $C_7$. These comparator circuits compare the signal V with respective threshold voltages indicated by $S_1$ to $S_7$ in FIGS. 2 and 3. These threshold voltages are formed in a manner known per se by means of a series of resistors $R_1$ to $R_8$ located between a d.c. voltage source and earth.

The threshold voltages $S_1$ to $S_7$ divide the field of the maximum range of the signal V into eight bands indicated B, $G_1$ to $G_6$ and W in FIG. 3. One half tone is associated with each of the bands and in particular the band B corresponds to black, the bands $G_1$ to $G_6$ correspond to six gray tones and the band W corresponds to white. The threshold voltages $S_1$ to $S_7$ thus define a half-tone scale.

The outputs of the threshold comparator circuits $C_1$ to $C_7$ are connected to the set inputs of flip-flops $FF_1$ to $FF_7$. The reset input of these flip-flops are connected to a clock 22.

The effect of the threshold comparator circuits $C_1$ to $C_7$ and the flip-flops $FF_1$ to $FF_7$, is to cause the signal V to undergo a form of analogue to digital conversion with successive samplings being carried out at the frequency established by the clock 22.

The outputs of the flip-flops are connected to six AND gates indicates $A_1$ to $A_6$ in FIG. 2. In particular the i'th gate $A_i$ has a first input connected to the output of the flip-flop $FF_i$ and a second input connected to the complementary or inverse output of the flip-flop $FF_{i+1}$.

It is immediately evident that when the signal V is below the level $S_1$ the outputs of all the gates $A_1$ to $A_6$ are at level "0". This situation corresponds to the sampling of a black portion of the image.

It is moreover immediately verified that when, for example, the signal V is in the band $G_3$ (that is, between the threshold levels $S_3$ and $S_4$) the output of the AND gate $A_3$ is at the level "1" while the outputs of all the other AND gates are at level "0". More generally, when the signal V falls into the band $G_i$, the output of the gate $A_i$ is at level "1" while the outputs of all the others are at level "0". The outputs of the gates $A_1$ to $A_6$ considered in their entirety provide, at each sampling instigated by the clock 22, an indication of the gray band or the half tone of the image portion represented by the sampled value of the signal V.

The outputs of the gates $A_1$ to $A_6$ are connected to the selection inputs of a digital-signal generator circuit 23 arranged to generate a plurality of combinations of digital signals (for example, sequences) each of which is indicative of a respective predetermined matrix pattern of white or black points associated with a respective half tone of the scale previously defined.

As is known, it is possible to reproduce different tones of gray by making use of more or less dense arrays or matrix patterns of white or black points. FIG. 5 illustrates several patterns by way of example, which are usable for the reproduction of black, of six half tones and of white. The patterns illustrated in FIG. 5 essentially comprise lines of alternating black and white points, with intervening white or black lines.

A matrix may thus be associated with black, with each gray tone and with white. Each matrix may be identified by means of sequences of digital signals (bits). In each of these sequences a "0" may correspond, for example, to a white point while a "1" corresponds to a black point.

The digital-signal generator circuit 23 is arranged to generate the bit sequences which define the lines and hence the pattern of the half tone identified at a particular time by the state of the outputs of the gates $A_1$ to $A_6$ considered in their entirety. The generator circuit 23 may be easily formed by a sequential logic network comprising a plurality of AND and NAND gates.

The output of the pulse sequences by the digital signal generator circuit 23 is clocked by a line counter circuit indicated 24. The output of the generator circuit 23 is connected to a first input of an OR gate 25 a second input of which is connected to the output of the flip-flop $FF_7$.

At each sampling of the signal V instigated by the clock 22, the OR gate 25 emits a sequence of signals which serve to identify the pattern of the gray band in which the sampled value of the signal V falls.

Conveniently, the clock 22 is of the type whose frequency can be varied, by means of an external control, between a certain number of predetermined frequencies. For this purpose, the timing pulse generator circuit 22 may include a series of oscillator circuits each of which generate pulses at a different respective frequency. The possibility of varying the frequency of sampling of the signal V gives considerable advantages which will become evident from the considerations which will now be turned to with reference to FIG. 4. In this Figure the waveform indicated v exemplifies a portion of the signal V on an expanded time scale. $S_i$ indicates generically one of the thresholds $S_1$ to $S_7$. The waveform indicated CK represents the signal output by the clock 20 which controls the scanning of the cells 2 of the array 1. The waveform indicated a indicates the signal output by the threshold comparator $C_i$ which compares the signal v with the threshold level $S_i$.

Supposing that the timing pulse generator circuit 22 is synchronised with and has the same frequency as the timing pulse generator circuit 20 and thus outputs the signal CK, then the output of the flip-flop $FF_i$, connected to the comparator circuit $C_i$, will present the waveform indicated b in FIG. 4.

Now supposing that the frequency of the clock 22 is varied and brought to a value greater than that of the clock 20, as indicated for example by the waveform CK' in FIG. 4, the signal output by the flip-flop $FF_i$ will now take on the waveform indicated c.

It is immediately evident that the waveform c is more faithful to the waveform a than the waveform b. In other words, this means that the loss of information in the analogue-digital conversion of the signal V is smaller the greater the frequency of sampling, that is, the frequency of the clock 22.

As may be seen from FIG. 4, a 50% increase in the sampling frequency (the frequency CK' is 50% greater than that of CK) gives a waveform c which is more faithful to the original signal V but described with six bits instead of four, that is again with an increase of 50%.

If the cell array 1 is formed so that each cell "reads" a pixel, for example with a definition of eight pixels/mm, a 50% increase in the sampling frequency enables the provision of the necessary digital signals for controlling a printer with a 50% increase in definition, that is with a definition of 12 pixels/mm.

It is thus apparent that with the apparatus according to the invention, it is possible to obtain reductions or enlargements respectively of the original if, when printing the reproduction of the image with a device having a predetermined definition, one carries out the reading of the original with a definition respectively less than or more than that of the printing device.

In the processing of composite images, that is, comprising image portions with half tones and image portions in white/black, the reproduction of these latter portions is problematical. Because of the limited band of the photodetector device 1 and the limits of resolution of the objective LL interposed between the original 0 and the photo-detector device 1, it may happen that portions of the signal V which fall within the gray bands $G_1$ to $G_6$ will correspond to white or black image portions. In the graph given by way of example in FIG. 3, the peaks $P_1$, $P_2$ fall in the gray bands although they relate to white points. The relative minimum N also falls in the grey bands although this relates to a black point.

With the processing of the half tones described previously, the peaks $P_1$, $P_2$ and the relative minimum N are treated as gray zones and hence, in the case of thin characters, one would as a result, obtain printed characters with a typical increase in the grays and falling off in the legibility of the image reproduced. This may happen even at the edges of thicker characters with a rather disagreeable effect.

In order to avoid these disadvantages it is necessary to process the image portions with half tones and the image portions in white/black in a different manner. For this purpose, a variable threshold comparator circuit 26 is provided in the processing circuit 3 illustrated in FIG. 2, for generating image signals usable for the reproduction of the image portions in white/black. The inputs of the circuit are connected in order to the outputs of the flip-flops $FF_1$ to $FF_7$. To avoid burdening the graphical representation, in FIG. 2 the connections between the flip-flops and the inputs of the circuits 26 are not illustrated.

Theoretically in order to obtain an image signal relating to a white/black image portion it would suffice to compare the signal V with a single threshold level, for example the threshold $S_4$. Thus the portions of the signal V above this threshold would be considered as associated with portions of white image and the portions of signal less than this threshold would be associated with portions of black images. As may be seen, however, from an examination of FIG. 3, this criterion is not satisfactory in that, in the example illustrated in this Figure, the negative peak N would be associated with a white image portion instead of black, with a consequent error in reproduction.

In order to avoid this inconvenience, the circuit 26 is essentially a variable threshold comparison circuit which, by means of an algorithm which could be characterised as "in pursuit" achieves the automatic adaptation of the comparison threshold to the value progressively assumed by the signal V. For an understanding of the operation of the circuit 26, reference is made to FIG. 3. At the beginning of the line of the image to be reproduced and hence at the beginning of the signal V, the circuit 26 assumes the threshold $S_1$ to be the transition threshold. This means that when the signal V is less than $S_1$ it is interpreted as relating to black image portions, while when it is greater than this threshold it is interpreted as relating to white image portions. The first black/white transition occurs at the point I. The signal V then passes through the successive thresholds $S_2$ to $S_5$ without the circuit 26 effecting further transitions. This circuit, as the signal V traverses new thresholds disables the preceding threshold $S_1$ and assumes the last threshold traversed by the signal V for the next transition. In order words, the last threshold encountered by the signal V when increasing is taken as the threshold for the reverse transition (white/black) whenever the signal V is decreasing. In the case of the variation of the signal V given by way of example and illustrated in FIG. 3, the first white/black transition thus occurs at the point II and then a subsequent black/white transition occurs at the point III. The circuit 26 thus provides a variable transition-threshold having, in the example of FIG. 3, a varying form as given in broken line in the drawing. One can see that the circuit 26, by implementing the algorithm explained above, allows the recovery of the information represented by the negative peak N which would otherwise be lost with a system with a fixed threshold.

The variable threshold comparator circuit 26 can be easily designed by utilizing bistable circuits (flip-flops), multiplexers and common logic gates.

As the signal V progresses, there are available at the output of the OR gate 25 digital image signals obtained by considering the signal V as describing an image with half tones. At the same time, at the output of the circuit 26 there are available digital image signals obtained by considering the signal V as relating to an image in white/black.

For processing composite images, a logic control circuit 27 having two inputs connected respectively to the outputs of the flip flops $FF_1$ and $FF_7$, counts, in the manner which will be described next, the number of consecutive image elements corresponding to half tones in the grey bands $G_1$ to $G_6$. This logic circuit 27 controls a switch device 28 with two positions or states, for selectively connecting an output conductor 29 to the output of the OR gate 25 or the output of the circuit 26.

If the number counted by the circuit 27, of consecutive image elements falling in the grey bands, is greater than a predetermined number Q, the logic circuit 27 maintains the switch device 28 in the condition or state in which this latter connects the conductor 29 to the OR gate 25. If, on the contrary, the number of consecutive image elements falling within the gray bands is less than Q, the logic circuit 27 causes the switching of the switch device 28 whereby the conductor 29 is supplied with the digital image signals output by the circuit 26. The logic circuit 27 can include, for example, a flip flop circuit, a delay circuit (for example one or more counter circuits) and a counter (pixel counter). When signal V exceeds reference signal $S_1$ or falls below reference signal $S_7$, the said flip flop circuit is set and delivers a start signal to the pixel counter and a control signal to the delay circuit, at the same time. The pixel counter counts the pixels at the frequency of the timing pulse generator (clock) 22. If, within a predetermined lapse of time (delay time of the delay circuit), the pixel counter has reached number Q the delay circuit is reset, otherwise after the said lapse of time the delay circuit causes the switching of the switch device 28.

In order to allow the logic circuit 27 to carry out the counting and comparison operations as described above, two delay lines $DL_1$ and $DL_2$ are connected between the switch device 28 and the outputs of the OR gate 25 and the circuit 26.

The delay lines $DL_1$, $DL_2$ delay the signals provided at the outputs of the OR gate 25 and the circuit 26 by a delay time corresponding to the time required for the logic circuit 27 to reach the end of its count.

The scanning and image processing apparatus described above thus allows the precise and faithful reproduction of documents with mixed alphanumeric graphical/half tone content.

Although in the examples described above with reference to the drawings, reference has been made to a system comprising seven threshold levels $S_1$ to $S_7$, clearly the number of these thresholds may be varied according to the number of gray tones which it is intended to be produced.

Naturally, the principle of the invention remaining the same, the embodiments and details of realisation may be varied widely with respect to that described and illustrated purely by way of non-limiting example without thereby departing from the scope of the present invention.

We claim:

1. An apparatus for scanning and digitally processing images with half tones, comprising
    an optical scanning device for scanning elements or portions of an image and for outputting corresponding electrical image signals, and
    a plurality of threshold comparator circuits for comparing the image signals with respective reference signals which define a scale of half tones,
    a digital-signal generator circuit arranged to generate a plurality of combinations of digital signals, each combination being indicative of a respective predetermined matrix pattern of white or black points, said pattern being selected by the signal output by the comparator circuit having the threshold defining the respective half tone of the scale; said matrix patterns being formed of a group of lines comprising only lines of alternating black and white points with intervening white or black lines.

2. An apparatus for scanning and digitally processing mixed images, comprising half-tone image portions and white/black image portions, comprising
    means for processing the half-tone image portions to generate signals according to a plurality of half tones of the scale,
    means for processing the white/black image portions, detection and switching means arranged to identify transitions from half-tone image portions to white/black image portions, and vice versa, and to output correspondingly the signals generated by the means for processing half-tone images or by the means for processing white/black images, wherein the said means for processing white/black images include a variable threshold comparison circuit for comparing the image signals with a plurality of reference signals associated to the various half-tones of the scale; the comparison circuit being arranged to take as its threshold at the beginning of each line of the examined image the lowest reference signal of the said reference signals and subsequently to take as its threshold the level of the reference signal last traversed by the image signal.

3. An apparatus according to claim 2, wherein a first and a second delay line are connected between the switch means and, respectively, the output of the digital-signal generator circuit and, the variable threshold comparison circuit.

4. An apparatus for scanning and digitally processing images with half tones, comprising an optical scanning device for scanning elements or portions of an image and for outputting corresponding electrical image signals, a plurality of threshold comparator circuits for comparing the image signals with respective reference signals which define a scale of half tones, a digital-signal generator circuit arranged to generate a plurality of combinations of digital signals, each combination being indicative of a respective predetermined matrix pattern of white or black points associated with a respective half tone of the scale, the digital-signal generator circuit in operation outputting the combination of digital signals which corresponds to the half tone indicated by the signals output by the threshold comparator circuits, and including a sampling and control circuit connected between the comparator circuits and the said digital-signal generator circuits and arranged to sample the outputs of the comparator circuits at a predetermined frequency and, at each sampling, to cause the output by the generator circuit of the combinations of digital signals associated with the half tone indicated by the signals output by the threshold comparator circuits, said sampling and control circuit including frequency modifying means for modifying the frequency of sampling of the outputs of said threshold comparator circuits, whereby the readout definition of the apparatus can be accordingly modified.

5. An apparatus according to claim 4, including a number n of said threshold comparator circuits, wherein the sampling and control circuit includes n flip-flops each of which has its set input connected to the output of one of the threshold comparator circuits; the reset inputs of the flip-flops being connected to timing pulse generator means; and
    $n-1$ AND gates; the i'th AND gate having a first input connected to the output of the i'th flip-flop, and a second input connected to the complementary or inverse output of the $(i+1)'$ the flip-flop; the outputs of the AND gates being connected to the pattern selection inputs of the digital-signal generator circuit.

6. An apparatus according to claim 5, further including an OR gate having a first input connected to the output of the flip-flop which is connected to the threshold comparator circuit having the largest value reference signal, and a second input connected to the output of the digital-signal generator circuit.

7. An apparatus for scanning and digitally processing images comprising:
    an optical scanning device for scanning elements of an image and for outputting corresponding electrical image signals,
    a plurality of threshold comparator circuits selectable for comparing the image signals with a plurality of reference signals associated with said circuits,
    a digital-signal generator circuit for generating digital signals in response to the selected one of said comparator circuits, and
    a selecting circuit for automatically selecting the comparator circuit associated with the threshold reference signal last traversed by the image signal, whereby for a reverse transition of the image signal the threshold is automatically adapted in pursuit of the same image signal.

8. An apparatus according to claim 7 for scanning and electronically processing mixed images, that is, comprising half-tone image portions and white/black image portions, wherein said generating circuit includes
    means for processing the half-tone image portions,
    means for processing the white/black image portions,
    said selecting circuit including detection means arranged to identify transitions from half-tone image portions to white/black image portions, vice versa, and comprising switching means operable for selectively outputting correspondingly the signals generated by the means for processing half-tone images or by the means for processing white/black images.

9. An apparatus according to claim 8, wherein the detection means is arranged to count the number of consecutive image elements with half tones different from the darkest half tone (black) and the lightest half tone (white) of the scale of half tones, to cause said switching means to actuate the means for processing half-tone images and the means for processing white/-black images respectively when this number is greater than and, less than a predetermined number.

10. An apparatus according to claim 9, wherein a sampling and control circuit is connected between each one of said comparator circuits and said digital circuits, said detection means including
- a logic circuit for controlling the switch device, connected to the output of the sampling and control circuits which are connected to the comparator circuits having the highest threshold, and the lowest threshold respectively.

11. An apparatus according to claim 10, wherein the logic circuit includes a counting circuit which initiates a count each time the sampled value of the image signal exceeds the lowest reference signal or falls below the uppermost reference signal of the threshold comparator circuits; the counting circuit stopping the said count each time the sampled value of the analogue signal falls below the lowest reference signal or exceeds the uppermost reference signal of these threshold comparator circuits.

* * * * *